(12) United States Patent
Anderson

(10) Patent No.: US 10,271,626 B1
(45) Date of Patent: Apr. 30, 2019

(54) SOLAR CHARGING, ILLUMINATED HUNTING BAG

(71) Applicant: Vincent Anderson, Murfreesboro, NC (US)

(72) Inventor: Vincent Anderson, Murfreesboro, NC (US)

( * ) Notice: Subject to any disclaimer, the term of this patent is extended or adjusted under 35 U.S.C. 154(b) by 0 days.

(21) Appl. No.: 15/870,961

(22) Filed: Jan. 14, 2018

(51) Int. Cl.
| | |
|---|---|
| A45C 15/06 | (2006.01) |
| H02S 20/00 | (2014.01) |
| H02S 10/40 | (2014.01) |
| A45C 13/00 | (2006.01) |
| A45C 13/10 | (2006.01) |
| A45C 13/28 | (2006.01) |
| A45C 3/00 | (2006.01) |

(52) U.S. Cl.
CPC ............ *A45C 15/06* (2013.01); *A45C 13/001* (2013.01); *A45C 13/008* (2013.01); *A45C 13/103* (2013.01); *H02S 10/40* (2014.12); *H02S 20/00* (2013.01); *A45C 13/28* (2013.01); *A45C 2003/002* (2013.01); *A45C 2003/008* (2013.01)

(58) Field of Classification Search
CPC ..... A45C 15/06; A45C 13/103; A45C 13/008; A45C 13/001; A45C 13/28; A45C 2003/008; A45C 2003/002; H02S 10/40; H02S 20/00
See application file for complete search history.

(56) References Cited

U.S. PATENT DOCUMENTS

| | | | | | |
|---|---|---|---|---|---|
| 4,783,725 | A | * | 11/1988 | Schaller | F21L 15/02 362/157 |
| 6,870,089 | B1 | * | 3/2005 | Gray | H01L 31/042 136/200 |
| 8,674,211 | B1 | * | 3/2014 | Palmer | H02S 30/20 136/244 |
| 9,814,257 | B2 | * | 11/2017 | Lee | A47J 19/027 |
| 9,814,287 | B1 | * | 11/2017 | Perez Vazquez | A45B 11/02 |
| 2009/0139814 | A1 | * | 6/2009 | Grossman | A45C 7/0086 190/18 A |
| 2011/0012552 | A1 | * | 1/2011 | Margalit | H02J 7/35 320/101 |
| 2011/0170282 | A1 | * | 7/2011 | Munoz | A45C 15/06 362/156 |
| 2012/0042996 | A1 | * | 2/2012 | Glynn | A45C 15/00 150/106 |

(Continued)

*Primary Examiner* — Ali Alavi
(74) *Attorney, Agent, or Firm* — John D. Gugliotta

(57) ABSTRACT

A camping bag is provided having a main holding volume with specialized compartments, and a carrying strap. The main holding volume is closed by a dual cover: a waterproofed zippered sealing end flap; and a clamped sealing side flap. The compartmentalized interior provides containment for small handheld electronic devices. A USB port is further provided that can be used to charge a portable electronic device while being stored within the main compartment. The outside of the side flap includes outwardly directed solar panel that provides a lightweight charging source that will ensure remote charging capabilities. A telescoping flexible light attached to the exterior of the bag can provide positionable task lighting. The instant abstract is neither intended to define the invention disclosed in this specification nor intended to limit the scope of the invention in any way.

10 Claims, 5 Drawing Sheets

(56) References Cited

U.S. PATENT DOCUMENTS

| | | | |
|---|---|---|---|
| 2016/0033092 A1* | 2/2016 | Killion | F21V 7/0075 40/555 |
| 2016/0375946 A1* | 12/2016 | White, Jr. | A45C 15/00 362/156 |
| 2018/0010741 A1* | 1/2018 | Barnes | F21L 4/027 |

* cited by examiner

SOLAR CHARGING, ILLUMINATED HUNTING BAG

RELATED APPLICATIONS

There are no previously filed, nor currently any co-pending applications, anywhere in the world.

BACKGROUND OF THE INVENTION

1. Field of the Invention

The present invention relates to outdoor, hunting and camping equipment and, more particularly, to a storage and luggage bag that is particularly well equipped for use in 'off-grid' environments.

2. Description of the Related Art

Improvements in living standards and the availability of ubiquitous technological communication have not only changed the way we live and work, but also have evolved our leisure time. Often during camping and while engaging in outdoor getaways, people still want to have access to power for lighting, charging communication equipment and the like.

Consequently, the availability of portable power adapted for easy of and functionality for carrying would be a desired improvement in the field.

SUMMARY OF THE INVENTION

It is thus an object of the present invention to provide a lightweight cargo storage and luggage bag that is well equipped for use in 'off-grid' outdoor activities such as hiking, camping, mountaineering, spelunking or the like.

It is a feature of the present invention to provide a compact, lightweight organized carrying bag that includes a solar charger for use with various small and portable electronic devices.

Briefly described according to a preferred embodiment of the present invention, a camping bag is provided providing a main holding volume, a plurality of specialized compartments within the main holding volume, and a carrying strap. The main holding volume includes a dual cover: a water-proofed zippered sealing end flap, and a clamped sealing side flap. The end flap zippers about the perimeter of the main holding volume in a water tight manner. The side flap includes a retention pocket that can retain item s that may be contained outside of the waterproof main compartment. The interior of the back can further have a compartmentalized interior to provide containment for small handheld electronic devices, which can be contained securely without worry of water intrusion. A USB port is further provided that can be used to charge a smartphone, GPS device, camera or other portable electronic device. Such charging can be done while being stored within the main compartment. The outside of the side flap includes an outwardly directed solar panel that provides a lightweight charging source that will ensure remote charging capabilities. Further, a telescoping flexible light attached to the exterior of the bag can provide positionable task lighting, and both interior and exterior LEDs offers enough light to either aid in seeing the contents or light the path or surroundings, if needed. The carrying strap attached to the bag is adjustable, thick and durable and aids in transporting the current bag and its contents to remote locations.

Advantages of the present invention include providing an outdoor activity bag that can illuminate the inside of the bag to be able to see contents, or provide exterior task lighting that is flexible to allow one to be able to see in close proximity.

Another advantage of the present invention is that the solar panel provides power to a USB port to be able to charge phones or other portable electronic devices from the security of a water proof containment.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
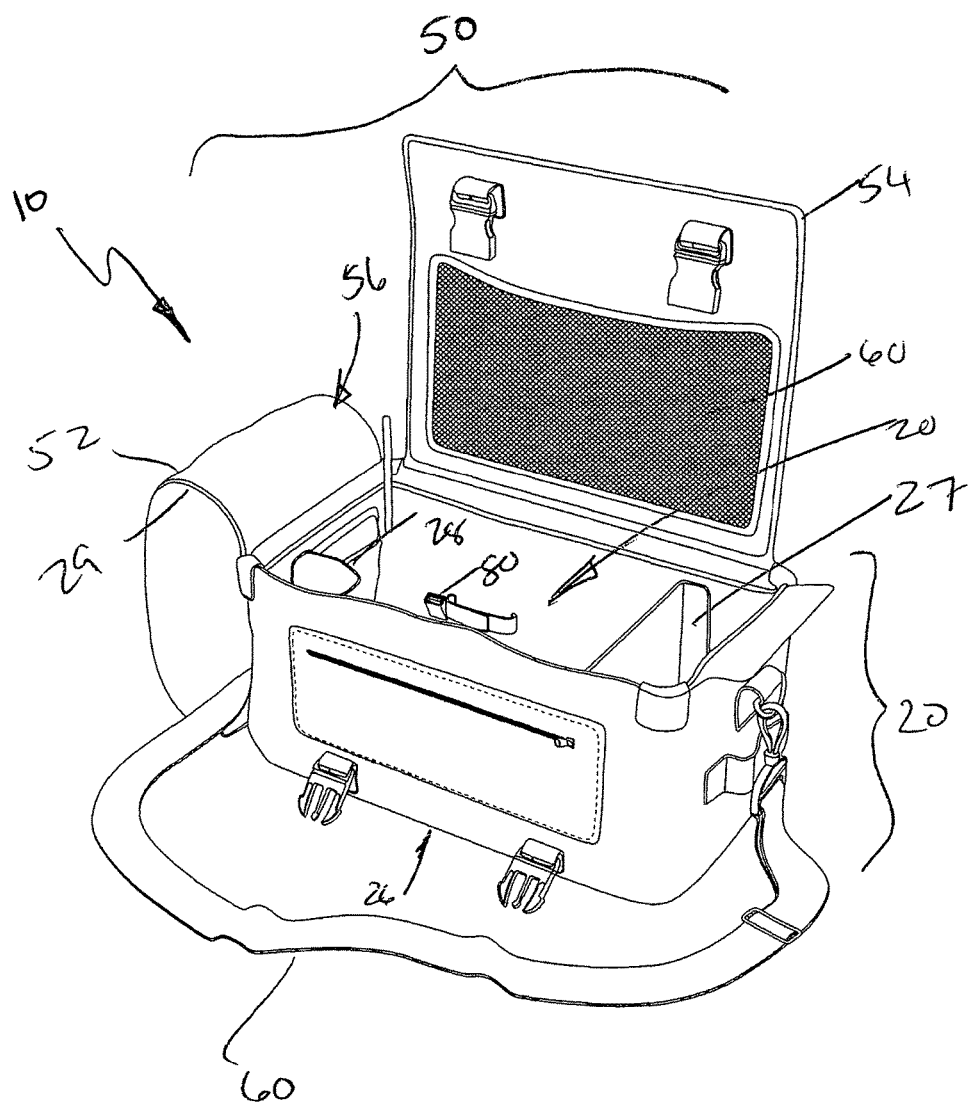
FIG. 1 depicts a top front perspective view of a camping bag according to the preferred embodiment of the present invention.
Figure 2:
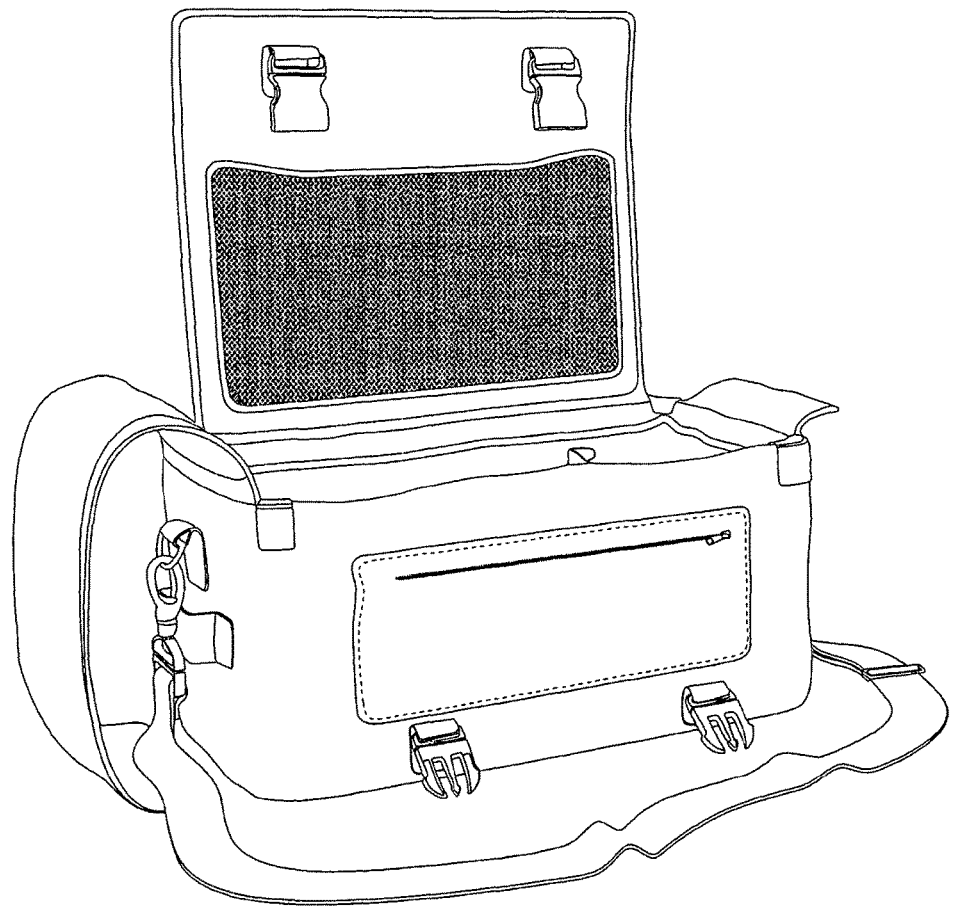
FIG. 2 is a front perspective view thereof.
Figure 3:
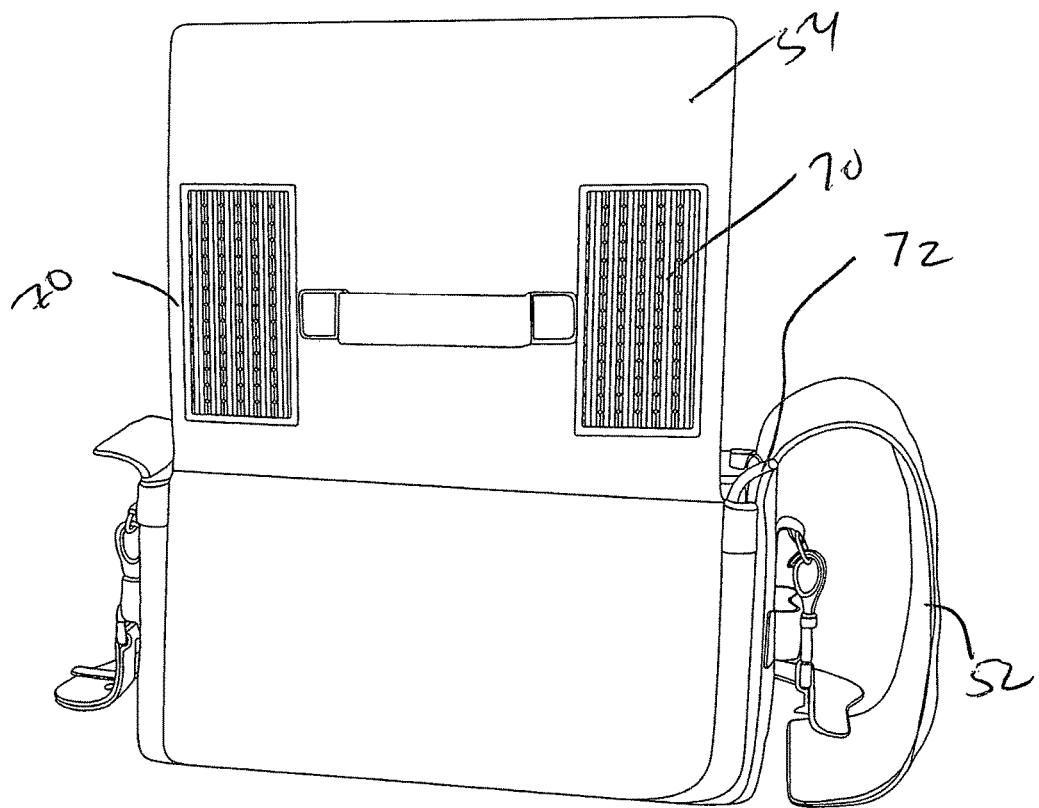
FIG. 3 is a rear perspective view thereof.
Figure 4:
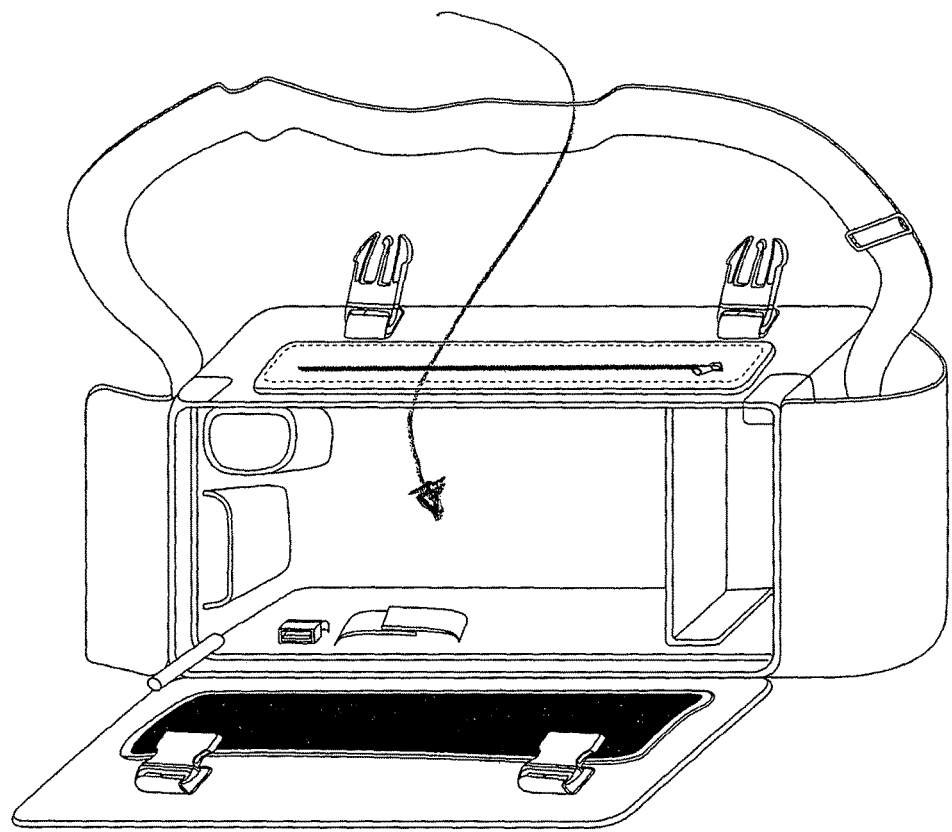
FIG. 4 is a top view thereof.
Figure 5:
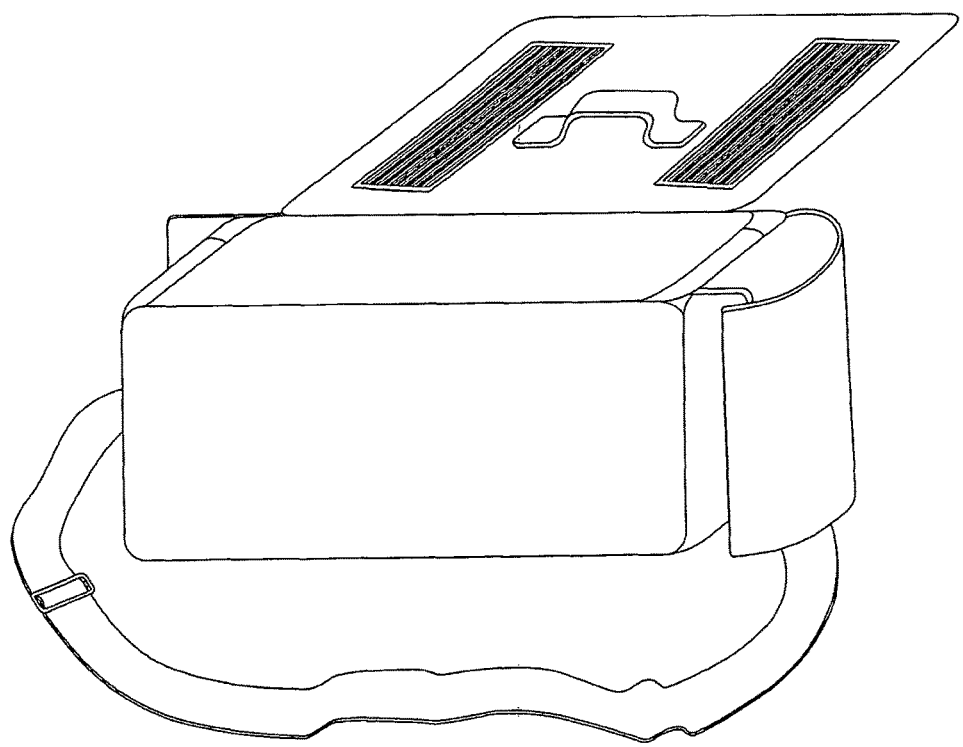
FIG. 5 is a bottom view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Referring now to the drawings, wherein like reference numerals indicate the same parts throughout the several views, a camping bag, generally noted as 10, is shown according to the preferred embodiment of the present invention. The camping bag 10 consists essentially of: a main holding volume 20; a closure system 50; and a carrying strap 60.

The main holding volume 20 provides a storage area for containment of various articles to be carried, stored or transported. The holding volume 20 may further provide a compartmentalized interior for containment of small handheld electronic devices, including a plurality of specialty compartments 22, 24 shown herein adapted for various sizes and constrainments. The interior volume 20 is further formed of a bottom 26 and sidewall 28 that may be formed of a sealed, water tight housing. Additionally, an internal lighting element 29, such as a light emitting diode (LED) lamps capable of providing illumination to the interior volume 20.

The closure system 50 is provided for closing and sealing the interior volume 20. The closure system 50 includes a dual cover: a waterproofed zippered sealing end flap 52; and a clamped sealing side flap 54. The end flap 52 has a slide fastener closure 56 about the perimeter of the main holding volume in a water tight manner. The side fastener closure 56 may have a PVC, polyurethane, or chloroprene tape 57 that is glued, sewn, or welded at a seam seal 58a at flap 52 or seam seal 58b at the bag sidewall 28. Water/air tight zippers 56 can be glued into applications with adhesives compatible with the zipper tape and substrate material. As would be apparent to one having ordinary skill in the relevant art, in light of the present teachings, a design selection based on the present teachings and scope may be used to specify zipper tape materials 57, zipper fastener materials, and sidewall connection mechanisms. By way of example, and not meant as a limitation, RF Welding (Radio Frequency, Dielectric, High Frequency Welding) may be used to bond similar polymer materials using radio waves. Zippers made of PVC and PU materials are used in applications where the zippers are attached to similar materials using RF welding techniques. The zipper is typically welded to the inside of the garment and seam sealed on all edges to prevent liquid or air penetration. Alternately, hot air can be used as an alternate. An additional hot melt adhesive may be required as a carrier between the zipper and the application material. Alternately, if the zipper is sewn, the sewn seam 58a, 58b must be covered with seam seal tape to prevent liquid or air leaks. In either alternative, the plurality of specialized compartments within, and the main holding volume itself, provide containment for various items, including electronic devices, without worry of water intrusion. The interior of the bag can further have a compartmentalized interior to provide containment for small handheld electronic devices, which can be contained securely without worry of water intrusion.

The side flap 54 includes a retention pocket 60 that can retain items that may be contained outside of the waterproof main compartment. The side flap 54 may further be affixed to the body of the bag through the use of mechanical fasteners 62, shown herein as clamps but may be equivalently provided as buttons, snaps, or other conventional bag fasteners.

Supported on the outside surface 66 of the side flap 54 is a solar cell 70. The solar cell 70 provides for recharging of electronics, operation of the internal lighting element 29, as well as for powering an external telescoping flexible light 72 attached to the exterior of the bag for providing positionable task lighting to either aid in seeing the contents or light the path or surroundings, if needed.

A USB port 80 is further provided in electrical communication with the solar cell 70. The USB port 80 may be positioned anywhere on the bag; however, it is preferred that the USB port 80 be affixed within the interior compartment 20 such that it can be used to charge a smartphone, GPS device, camera or other portable electronic device, and that such charging can be done while the devices are being stored within the main compartment and sealed in a water tight manner.

A carrying strap 85 is further provided attached to the bag is adjustable, thick and durable and aids in transporting the current bag and its contents to remote locations.

2. Operation of the Preferred Embodiment

In operation, the present invention provides a compartmentalized interior that is perfect to store your lunch, breakfast, dinner or snacks. Equipped with bright interior and exterior LEDs, the camping bag offers enough light to let a user see what is inside, or to light a path if needed. The carrying strap attached to the bag is slightly adjustable, thick and durable, and provides for easy transport. The waterproof zippered pocket is the ideal spot to store your gadgets, while small solar panel and USB port render the power you need to keep them charged.

The interior of the bag offers a large main compartment, a drink holder, a mesh screen and a USB port that can be used to charge your smartphone, GPS device or camera. The solar panel ensures access to electrical power, even when far away from an electrical outlet. The waterproof pocket allows for the safe storing of smartphone and/or other devices. The light attached to the exterior of the bag is flexible to provide for directional task lighting.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A camping bag comprising:
a main holding volume formed of a bottom circumscribed by a continuous sidewall and forming an upper opening;
a carrying strap attached to the camping bag;
a cover for sealing said upper opening, said cover further comprising:
a waterproofed zippered sealing end flap; and
a clamped sealing side flap having an inner surface opposite an outer surface;
an outwardly directed solar panel affixed to said outer surface, said solar panel adapted to provide an electrical charging source;
a USB port affixed to said sidewall, accessible within said main holding volume, and in electrical communication with said solar panel, said USB port adapted to provide an operational electrical battery charge for a portable electronic device;
an electrical storage cell formed within said main holding volume and in a first electrical communication with said solar panel; and
a telescoping flexible task lamp attached to an exterior of sidewall and in a second electrical communication with said solar panel;
wherein said telescoping flexible task lamp is adapted to provide be positionable task lighting.

2. The camping bag of claim 1, further comprising:
an electrical storage cell formed within said main holding volume and in a third electrical communication with said solar panel; and
an interior illumination element attached to an interior sidewall and in a fourth electrical communication with said solar panel;
wherein said interior illumination element is adapted to provide illumination within said main holding volume.

3. The camping bag of claim 1, wherein said USB port is further adapted for charging a portable electronic device while such portable electronic device is stored within main holding volume.

4. The camping bag of claim 1, further comprising:
an electrical storage cell formed within said main holding volume and in a third electrical communication with said solar panel; and
an interior illumination element attached to an interior sidewall and in a fourth electrical communication with said solar panel;
wherein said interior illumination element is adapted to provide illumination within said main holding volume.

5. The camping bag of claim 4, wherein said main holding volume further comprises a plurality of specialized compartments within the main holding volume.

6. A camping bag comprising:
a main holding volume formed of a bottom circumscribed by a continuous sidewall and forming an upper opening;
a carrying strap attached to the camping bag;
a cover for sealing said upper opening, said cover further comprising:
a waterproofed zippered sealing end flap; and
a clamped sealing side flap having an inner surface opposite an outer surface;
an outwardly directed solar panel affixed to said outer surface, said solar panel adapted to provide an electrical charging source;
a USB port affixed to said sidewall, accessible within said main holding volume, and in electrical communication with said solar panel, said USB port adapted to provide an operational electrical battery charge for a portable electronic device, wherein said USB port is further adapted for charging a portable electronic device while such portable electronic device is stored within main holding volume;
an electrical storage cell formed within said main holding volume and in a first electrical communication with said solar panel; and
a telescoping flexible task lamp attached to an exterior of sidewall and in a second electrical communication with said solar panel;
wherein said telescoping flexible task lamp is adapted to provide be positionable task lighting.

7. The camping bag of claim 6, further comprising:
an electrical storage cell formed within said main holding volume and in a third electrical communication with said solar panel; and
an interior illumination element attached to an interior sidewall and in a fourth electrical communication with said solar panel;
wherein said interior illumination element is adapted to provide illumination within said main holding volume.

8. The camping bag of claim 6, further comprising:
an electrical storage cell formed within said main holding volume and in a third electrical communication with said solar panel; and
an interior illumination element attached to an interior sidewall and in a fourth electrical communication with said solar panel;
wherein said interior illumination element is adapted to provide illumination within said main holding volume.

9. The camping bag of claim 8, wherein said main holding volume further comprises a plurality of specialized compartments within the main holding volume.

10. A camping bag comprising:
a main holding volume forming a plurality of specialized compartments;
a carrying strap affixed to and adapted for lifting said main holding volume;
a dual cover closure for said main holding volume comprising:
a waterproofed zippered sealing end flap; and
a clamped sealing side flap;
a USB port adapted for used to charge a portable electronic device while being stored within the main compartment;
an outwardly directed solar panel affixed to an outside surface of said side flap;
an electrical storage cell formed within said main holding volume and in a third electrical communication with said solar panel; and
an interior illumination element attached to an interior sidewall and in electrical communication with said solar panel; and
an interior illumination element attached to an interior sidewall and in electrical communication with said solar panel.

* * * * *